United States Patent [19]

Sakaguchi et al.

[11] Patent Number: 4,967,205

[45] Date of Patent: Oct. 30, 1990

[54] THERMAL HEAD CONTROL DEVICE

[75] Inventors: Masatoshi Sakaguchi, Gifu; Yasunori Kitazawa, Anjo, both of Japan

[73] Assignee: Brother Kogyo Kabushiki Kaisha, Aichi, Japan

[21] Appl. No.: 358,879

[22] Filed: May 30, 1989

[30] Foreign Application Priority Data

Jun. 6, 1988 [JP] Japan ............................... 63-138677

[51] Int. Cl.$^5$ ............................................ G01D 15/10

[52] U.S. Cl. ................................................ 346/76 PH

[58] Field of Search .................................... 346/76 PH

[56] References Cited

U.S. PATENT DOCUMENTS 3,700,852 10/1972 Ruggiero ........................ 219/216 X 4,563,691 1/1986 Noguchi et al. ............... 346/76 PH

FOREIGN PATENT DOCUMENTS 2147250 5/1985 Japan .

OTHER PUBLICATIONS

JP Provisonal Publication No. Sho 62-157233.

*Primary Examiner*—Bruce A. Reynolds
*Assistant Examiner*—Gerald E. Preston
*Attorney, Agent, or Firm*—Kane, Dalsimer, Sullivan, Kurucz, Levy, Eisele and Richard

[57] ABSTRACT

A thermal head control device for a thermal printer counts the number of printing operations and spacing operations. The energization period for the printer heat elements is controlled in accordance with the counts obtained.

6 Claims, 8 Drawing Sheets

THERMAL HEAD CONTROL DEVICE

BACKGROUND OF THE INVENTION

This invention relates to a thermal head control device arranged to prevent the deterioration of a printing quality caused by the overheating of a thermal head when a thermal printer carries out a continuous printing, and more particularly, to a thermal head control device having a function capable of shortening a period for energizing heat elements of the thermal head and controlling the period so as not to be lowered below a predetermined value.

Conventionally, when a thermal printer carries out a continuous printing, there is a problem that a thermal head is overheated and printing quality is deteriorated. Then, there is a device wherein when the same heating element provided with a thermal head is continuously energized, an energizing period therof is shortened. Since, however, a temperature increase caused by the energizing of one heating element affects heating elements disposed in the vicinity of it, there is a problem in a continuous printing that a printing quality is deteriorated because of the overheating of the thermal head even if the same heating element is not continuously heated.

Therefore, as disclosed in Japanese Utility Model Provisional Publication SHO62-157233, a device is proposed wherein dot densities are counted and totaled, and a period for energizing all heating elements is shortened by a result of the count.

The device disclosed in the above Japanese Utility Model Provisional Publication SHO62-157233, however, has a problem in that control is complex, processing time is increased, and high speed printing is difficult because dot densities are counted and totaled.

Further, with this conventional device, since there is a temperature increase by the energizing of heating elements and heat radiation from a thermal head itself, the temperature increase in the thermal head is gradually equilibrated with the heat radiation therefrom when an energizing period of the device is continuously shortened. If the energizing period is further shortened in this state, the temperature of the thermal head begins to fall. As a result, there are problems that the temperature of the thermal head is excessively low, and thus printing is made too light, and in some cases characters become blurred or are not printed. In particular, in the modern society where information is highly utilized, a printer and the like are required to carry out a high speed and high quality printing so that the solution of the above problems is desired.

SUMMARY OF THE INVENTION

It is therefore an object of the present invention to provide an improved thermal head control device capable of controlling the temperature of a thermal head for preventing the deterioration of a printing quality caused by an overheating or an insufficiency of heating of the thermal head.

For this purpose, according to this invention, there is provided a thermal head control device comprising energize means for energizing the desired number of heat elements being provided with a thermal head member, the thermal head control device further comprises: first counter means for counting the number of printing operation executed by the thermal head member; adjust means for adjusting a period for energizing the heat elements; and first control means for controlling the adjust means so as to shorten the period for energizing the heat elements by a predetermined differential value till the period becomes the first predetermined value each time when the number counted by the first counter means reaches a predetermined value.

DESCRIPTION OF THE ACCOMPANYING DRAWINGS

FIG. 1 is a partially exploded perspective view of a word processor incorporating the thermal head control device embodying the invention;

FIGS. 2(A) (B) are block diagrams of an electronic control device of the word processor shown in FIG. 1;

FIGS. 3(A) (B) (C) are flow charts of the energizing control operation executed by the electronic control device shown in FIGS. 2(A) (B); and FIGS. 4(A) (B) are timing charts explanatory of the energizing control.

DESCRIPTION OF THE EMBODIMENTS

Figure 1:
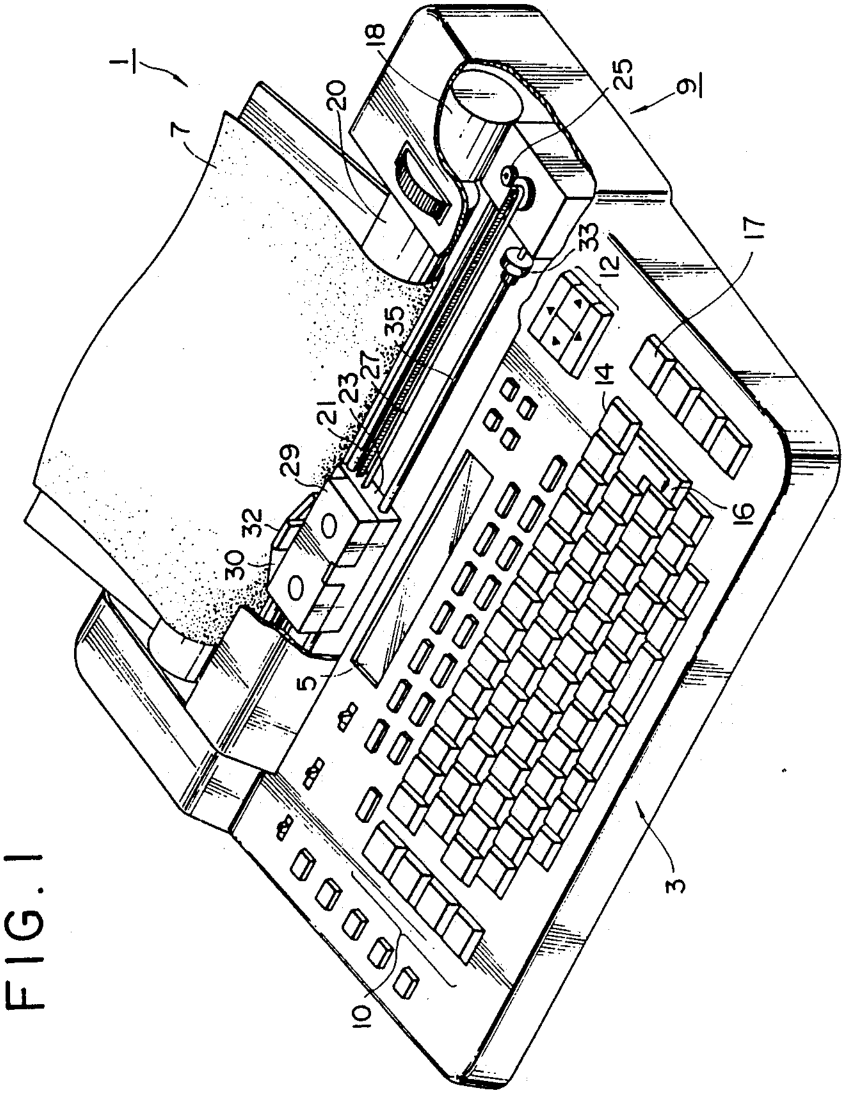
Figure 2A:
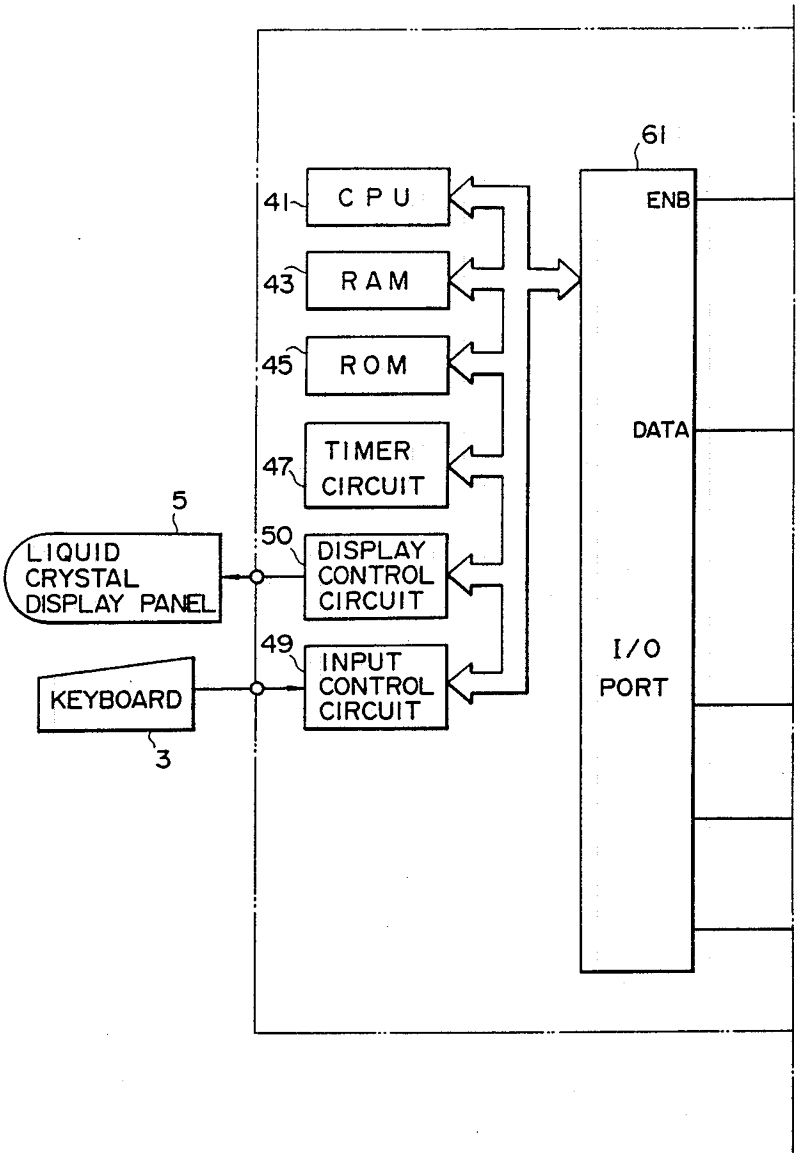
Figure 2B:
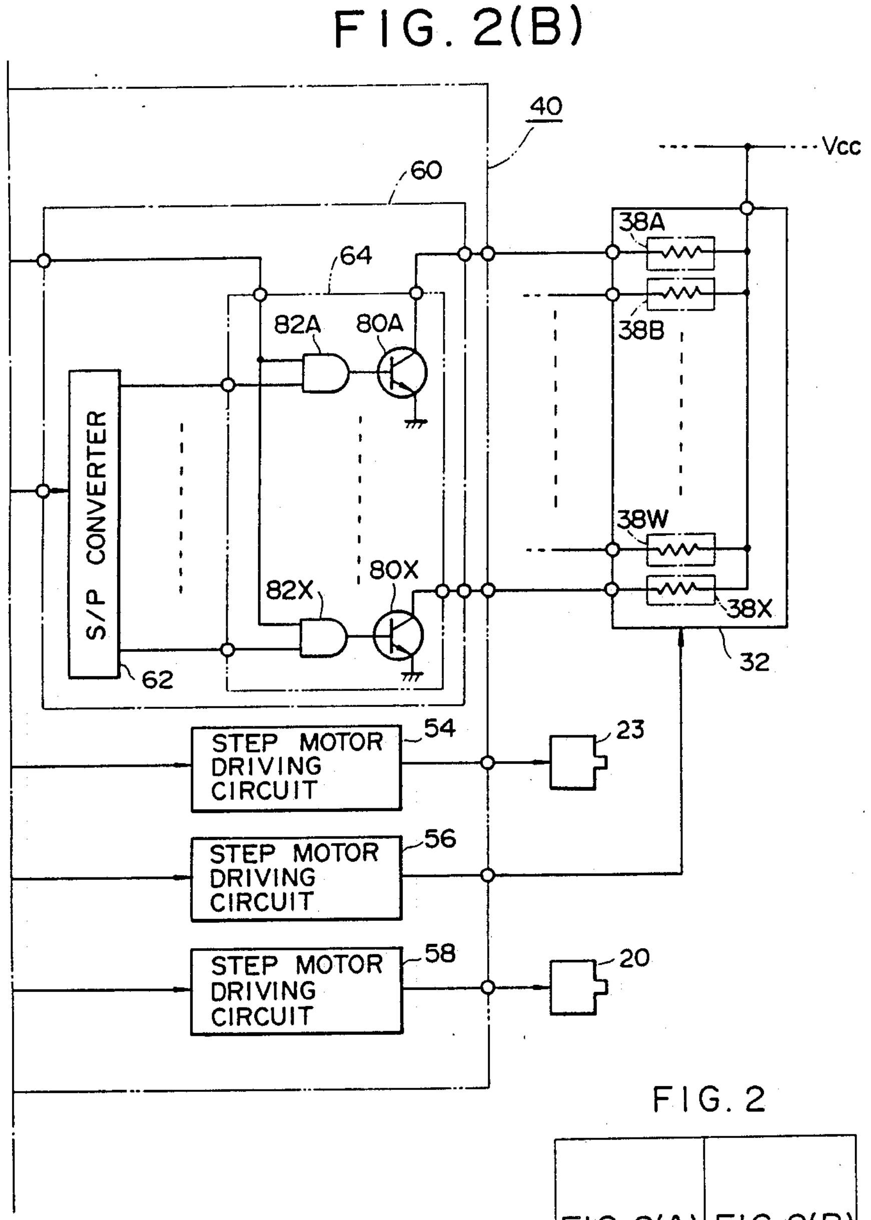
Figure 2:
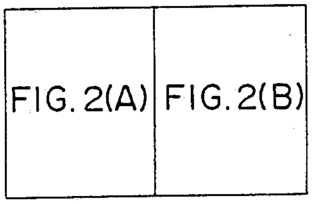

An embodiment of a thermal head control device according to the present invention will be described with reference to the drawings. FIG. 2 is a partially exploded perspective view of a word processor provided with the thermal head control device according to this embodiment. FIGS. 2(A) and (B) are block diagram of the arrangement of the thermal head control device.

The word processor 1 comprises a keyboard 3 including various keys arranged thereon, a liquid crystal display panel 5 for displaying print data up to 24 characters input from the keyboard 3, and a thermal transfer recording type printer 9 for recording the print data on a print sheet 7. The keyboard 3 is provided with a print key 14 for instructing a start of printing operation, a line feed key 16 for instructing a line feed operaiton and the like, in addition to character keys 10 and a cursor movement keys 12 which are usually employed.

The printer 9 comprises a platen 20 rotated by a step motor 18, a guide bar 21 disposed in parallel with the platen 20, a carriage base 23 slidingly supported by the guide bar 21, a timing belt 27 partially engaged with the carriage base 23 and driven by the rotation of the step motor 25, a ribbon cassette 29 placed on the carriage base 23, a thermal head 32 through which an ink ribbon 30 in the ribbon cassette 29 is stretched, a drive shaft 35 for pressing the thermal head 32 against the print paper 7 by the rotation of the step motor 33, and the like. Twenty four pieces of resistance heating elements 38A–38X longitudinally arranged in a single column are exposedly disposed in front of the thermal head 32 on the side of the print paper 7. The ink ribbon 30 pressed against the print paper 7 by the thermal head 32 comprises a film composed of polyester or the like having its surface on which a solid ink is coated. The solid ink is composed of a low viscosity resin such as an ethylenevinyl acetate copolymer resin or an ethylene-ethyl acrylate resin, a high viscosity resin such as a polyvinyl alcohol, and a pigment, and molten at a temperature of about 150° C. or more. The adhesive power of the solid ink is increased in the molten state. Therefore, when heated by the heating elements 38A–38X of the thermal head 32 the solid ink is molten, and adhered and transferred to the print paper 7.

The printer 9 arranged as described above energizes desired ones of the heating elements 38A–38X each time the thermal head 32 moves horizontally to effect the thermal transfer of a pattern in accordance with print data in serial, the energizing being effected 24 times to generate the pattern accompanied by the movement of the thermal head 32 thereby to print a character having the resolution of 24 dots ×24 dots. The printing operation of the printer 9 is controlled by an electronic control device 40 mounted on the word processor 1.

As shown in FIG. 2(A) and (B), the electronic control device 40 comprises a timer circuit 47, an input control circuit 49 and a display control circuit 50 in addition to a known CPU (Central Processing Unit) 41, RAM (Random Access Memory) 43 and ROM (Read Only Memory) 45. The input control circuit 49 reads print data of keys depressed by a user. The display control circuit 50 displays the print data read by the input circuit 49 on the liquid crystal display panel 5. Further, the electronic control device 40 includes a step motor driving circuit 54 for carrying the carriage base 23, a step motor driving circuit 56 for pressing the thermal head 32, a step motor driving circuit 58 for rotating the platen 20, and a power supply circuit 60 for energizing the thermal head 32, which are coupled with the CPU 41 through an I/O port 61.

The power supply circuit 60 is provided with a serial to parallel converter 62 and a thermal head driving circuit 64 for energizing desired one of the heating elements 38A–38X of the thermal head 32. The thermal head drive circuit 64 is provided with switching transistors 80A–80X corresponding to the respective heating elements 38A–38X and AND gates 82A–82X coupled with base terminals thereof. An energizing time signal T output from an energizing time indicating terminal "ENB" of the I/O port 61 and a print data signal output from a print data terminal DATA therof through the serial to parallel converter 62 are applied to the AND gates 82A–82X. The switching transistors 80A–80X are turned on and off in accordance with both the signals.

The print data signal is read from a character generator in the ROM 45 by the CPU 41 and applied to the serial to parallel converter 62 through the print data terminal DATA. The print data applied is converted to a parallel signal in the serial to parallel converter 62 and applied to the thermal head drive circuit 64. The energizing time signal T is applied to the thermal head drive circuit 64 by the CPU 41 through the energizing time indicating terminal ENB.

Note that in the present embodiment, the energizing time indicating signal T is calculated and determined by the CPU 41 according to a printing condition between a first set time $T1=1$ msec. as an upper limit and a second set time $T2=0.7$ msec. as a lower limit each stored in the ROM 45. More specifically, the energizing time is controlled so that the thermal head 32 is heated at the most suitable temperature and a high quality printing is carried out.

Figure 3A:
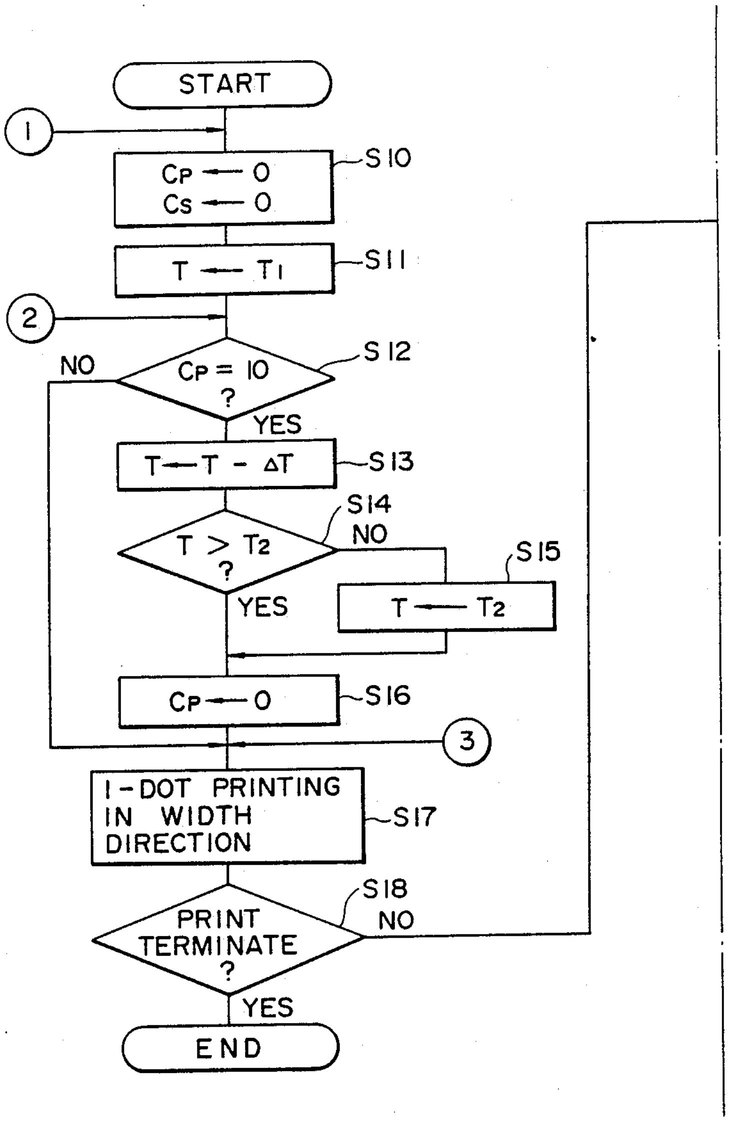
Figure 3B:
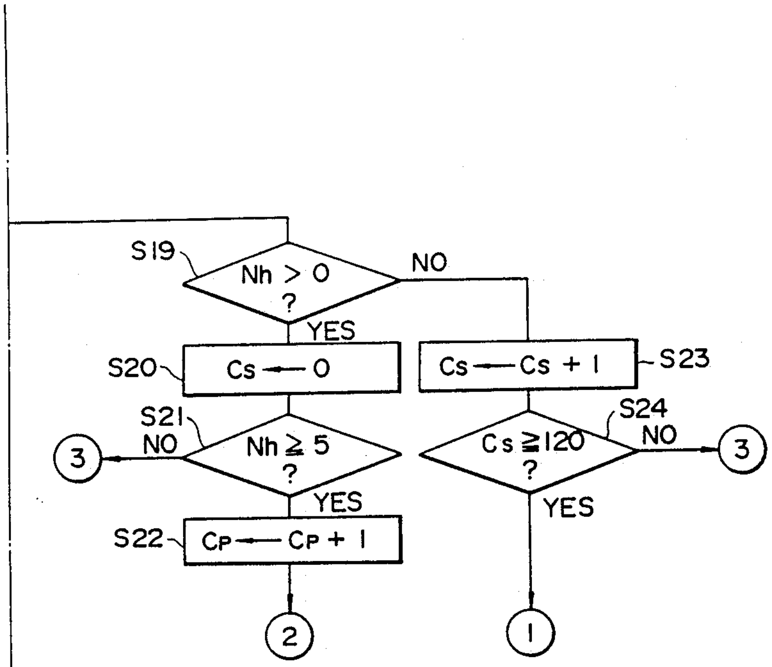
Figure 3:
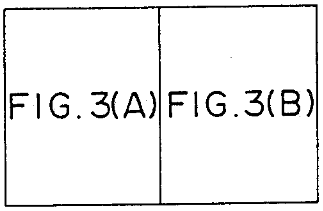

Next, the energizing time control will be described with reference to FIG. 3(A) and (B).

When a printing starts, at step S10, a printing counter Cp for determining if a printing is continuously carried out by the number of horizontal dots and a space counter Cs for determining if spaces are continued are respectively cleared. Then, at step S11, the first set time $T1=1$ msec. is set as the energizing time indicating signal T. Next, at step S12, if $Cp=10$ is determined. More specifically, it is determined if the printing continues longer than a predetermined period and the thermal head 32 is overheated. If the operation continues longer than the predetermined period, the process goes to step S13, but if the operation does not continue longer than the predetermined period, the process goes to step S17. At step S13, the energizing time indicating signal T is shortened by a predetermined shortening time $T=0.01$ msec. More specifically, the energizing time is shortened and a heating energy is restricted to prevent the overheat of the thermal head 32. Next, at step S14, if the above shortened time T is greater than the second set time $T2=0.7$ msec. is determined. If the time T is greater than this set time T2, the process directly goes to step S16, but if the time T is less than this set time T2, the process goes to step S16 through step S15. At step S15, $T2=0.7$ msec. is set as the time T. More specifically, it is prevented that the amount of heat discharged from the thermal head 32 exceeds the amount of heat generated therein and the thermal head 32 is not heated to a desired temperature. At step S16, the print counter Cp is cleared and the process goes to step S17. In other words, the energizing period for the heat elements is determined in each timing the printing counter Cp indicates the value "10". At step S17, the desired character of one dot width is printed in accordance with the print data signal read from the character generator, or the thermal head 32 is only advanced without printing operation in case the dot is a space dot. Next, at step S18, if a print end condition is satisfied is determined. More specifically, the print end is determined when no output data exists at the data terminal DATA, a line feed instruction is input or the like, and then the print processing is terminated.

On the other hand, when the print end condition is not yet satisfied, the decision at step S18 is NO and the process goes to step S19. At step S19, it is determined if the number of dots "Nh" of the 24 pieces of the heating elements 38A–38X energized for the one dot printing effected at step S17 is greater than 0. If the number is greater than 0, the process goes to step S20, but if the number is less than 0, the process goes to step S23. More specifically, if the number is greater than 0, since the printing is continuously carried out, the space counter Cs is cleared at step S20. Next, at step S21, if $Nh>5$ is determined. If "Nh" is equal to or greater than 5, the printing counter Cp is incremented at step S22, and then the process returns to step S12. If "Nh" is less than 5, the process returns to step S17. More specifically, even if the printing is coutinuously carried out, when only heating elements less than 5 pieces of 24 pieces of the heating elements 38A–38X are energized, no heating energy is considered to be accumulated in the thermal head 32, and then a priting for a next one dot width is carried out at the time without executing the processes at step S12 through step S16. On the other hand, if heating elements of 5 pieces or more of the 24 pieces of the heating elements 38A–38X are energized, a heating energy is considered to be accumulated in the thermal head 32, and then the energizing time is shortened at step S12 through step S16.

If it is determined at step S19 that "Nh" is not greater than 0, that is, a space is inserted during the printing, the space counter Cs is incremented at step S23. Next, at step S24, if the space counter $Cs \geq 120$ is determined. If the space counter Cs is equal to 120, the process returns to step S10 where both of the print counter Cp and the space counter Cs are cleared, and $T=T1=1$ msec. is set again at step S11 to continuously control the printing. This is because that no heating energy is accumulated in the thermal head 32 by the discharge of heat like the time when the priting starts because spaces greater than the predetermined number are continuously inserted and the energizing is not effected longer than the predetermined time. Conversely, if the space counter Cs is not greater than 120, the process returns to step S17 to continue a printing of a next one dot width as it is.

Figure 4A:
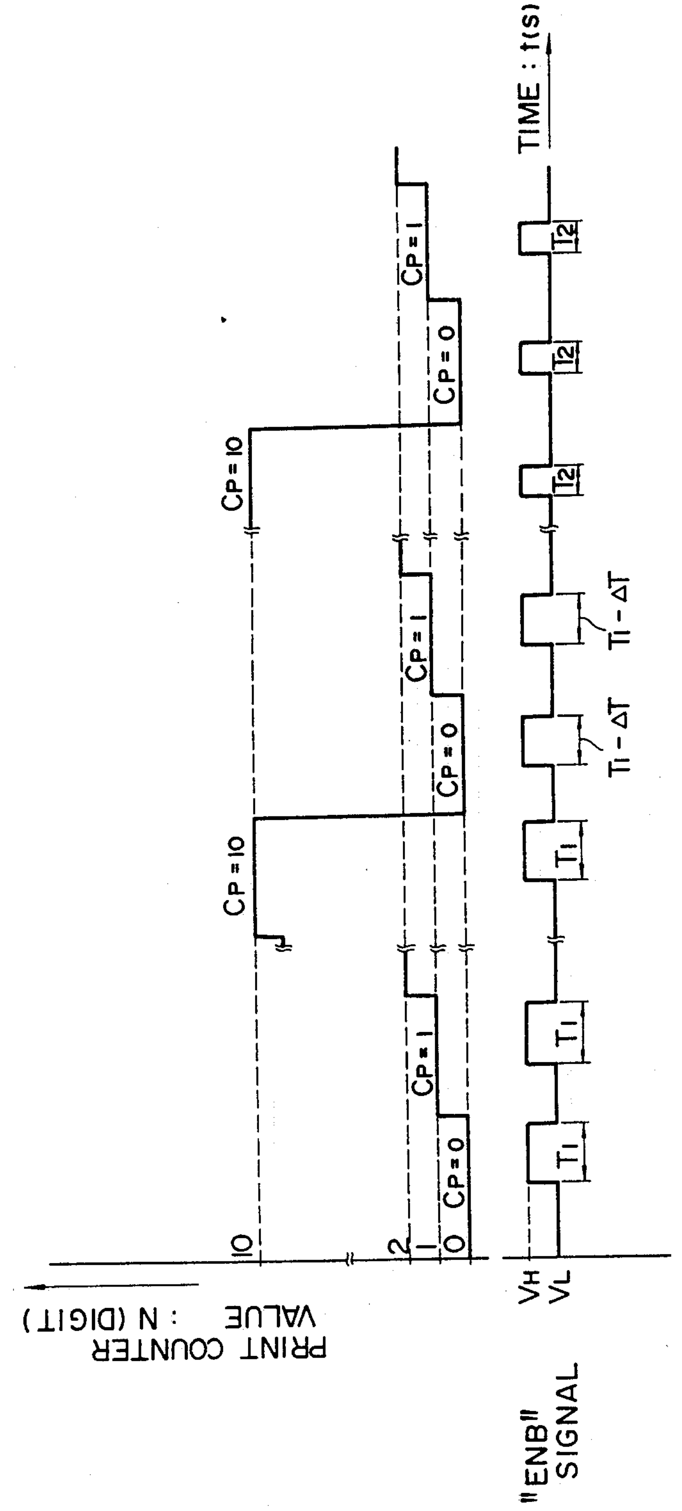
Figure 4B:
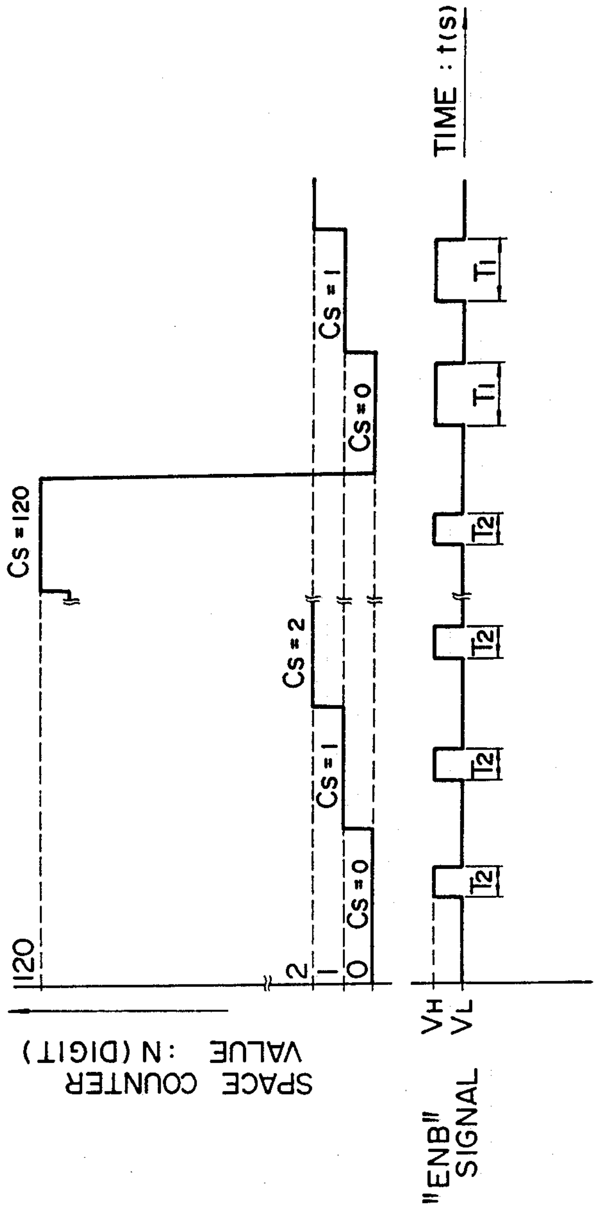

Next, the change in the energizing time caused by the above control will be described with reference to timing charts of FIGS. 4(A) and 4(B).

First, the control for shortening the energizing time in the continuous printing will be described. As shown in FIG. 4(A), the heating element 38A–38X are energized for the time T1 based on the energizing time indicating signal T=T1=1 msec. (S11) just after the printing starts and the printing is carried out (S17). After that, if the printing is continuously carried out (YES at S21), the print counter Cp is incremented (S22). When Cp=10, the energizing time indicating signal T is reduced by T=0.01 msec. (S13) and the heating elements 38A–38X are energized for the time T1–T to carry out the printing (S17). After that, the printing counter Cp is cleared (S16), and then the above control for shortening the energizing time is repeated again (S12–S16) so that this energizing time is shortened by T each time (S13). When the energizing time becomes T2=0.7 msec. as a result that the shortening control (S12–S16) is repeated, the energizing time is not further shortened (S14 and S15). With this arrangement, the energizing time is gradually shortened as the priting is continuously carried out, and when the predetermined value T2 is reached, the energizing time is not further shortened.

Next, a control for restoring the energizing time necessary when sapces are continuously inserted will be described. As shown in FIG. 4(B), if spaces are continuously inserted, the space counter Cs is incremented (S19 and S23). The energizing time is kept at the value just before the spaces begin to continue until Cs=120 is reached. Actually, however, since the print data signal indicates the spaces, the AND gates 82A–82X remain closed, and the no heating elements 38A–38X are energized. After that, when Cs=120 is reached, the energizing time is restored to the state when the printing starts (S24 and S11).

As described above, according to the present embodiment, the energizing time is shortened in case that a printing operation continuously carried out and the energizing time is restored when spaces are continued, whereby the heating condition of the thermal head 32 is optimized to realize a high quality printing.

As described above, accoridng to the present embodiment, the deterioration of a printing quality caused by the overheat of the thermal head 32 is prevented when a printng is continuosly carried out as well as a printed character is prevented from being blurred and from not being atually printed by the insufficient heating of the thermal head 32 by setting the lower limit energizing time. When spaces greater than the predetermined number are counted, the energizing time is restored to the value at the beginning of the printing so that a good printing quality is maintained after the spaces are counted. Further, since the continuous printing and continuous spaces are determined based on the print counter Cp and the space counter Cs corresponding to the number of dots in a horizontal direction, a complex calculation such as the totaling of dot densities is not necessary. Since the printing counter Cp is not incremented when five or more heating elements corresponding to about twenty presents of the 24 pieces of the heating elements 38A–38X are not energized, the actual condition of a heating energy accumulated in the thermal head 32 is simply determined without the need for totaling the dot densities, whereby a proper control can be easily executed at a high speed. As a result, a high quality and high speed printing can be realized.

Although an embodiment of the present invention is described, the invention is not to be limited to this embodiment, but various modifications thereof can be employed without departing from the scope and spirit of the invention.

Figure 3C:
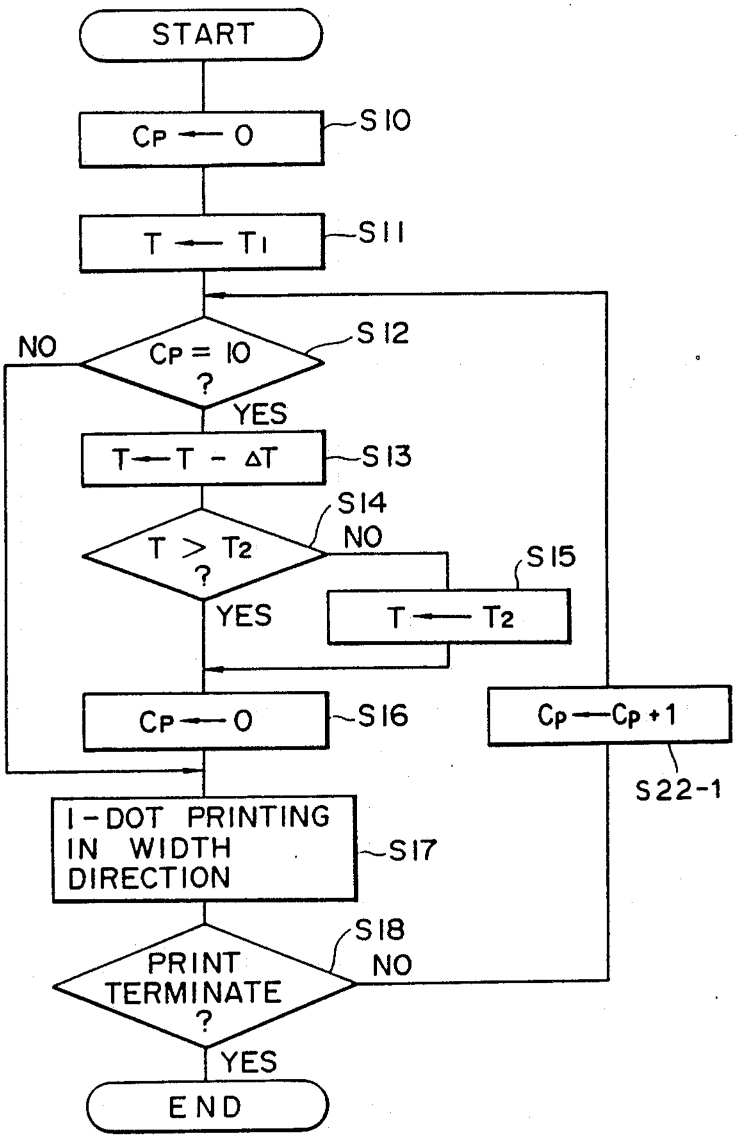

For example, when the energizing time is shortened, the reference for determination in step S12 may be modified depending on a printing speed, a printing thickness, a style of printing and the like. For exmaple, when a high speed printing mode is selected by a printing speed selection key 17 and the like, the thermal head 32 is easily overheated because energizing intervals are shortened. Thus, the value determined by the print counter $C_p$ at step S12 may be made smaller than a value used at a usual speed and intervals at which the energizing time is shortened may be made shorter to execute an optimum control. As a result, a high quality printing is executed at a high speed. A continuous printing of an English sentence may be continuously carried out a high speed, as shown in FIG. 3(C), ignoring spaces. The values of T1, T2, and T may be varied according to a result of a detecting operation of a detect means for detecting room temperature condition and the like when a printing is carried out. For example, with a heat sensitive thermal printer capable of printing in both ways, the processings shown in FIG. 3(A) and (B) may be continued until a printing for one page is completed without being limited to a printing for one line.

What is claimed is:

1. A thermal head control device comprising energize means for energizing a desired number of a plurality of heat elements being provided with a thermal head member, said thermal head control device further comprises:

counter means for counting the number of times of printing operation and spacing operation executed by said thermal head member;

adjust means for adjusting a period for energizing the heat elements; and control means for controlling said adjust means so as to shorten a period for energizing the heat elements by a predetermined differential value until the period becomes a first predetermined value each time the number of printing operations counted by said counter means reaches a predetermined value and for setting the period for energizing the heat elements to a second predetermined value in case the number of the successive spacing operation counted by said counter means reaches another predetermined value.

2. The thermal head control device accroding to claim 1 wherein said heat elements are vertically arranged in line.

3. The thermal head control device according to claim 1 which further comprises examine means for examining whether the number of said heat elements being energized in a printing operation is less than a predetermined value; and inhibit means for inhibitting the counting operation executed by said first coutner means in case that the number examined by said examine means less than the predetermined value.

4. The thermal head control device according to claim 3 wherein the number of heat elements provided with said thermal head member is twenty four, and said predetermined value examined means is five.

5. The thermal head control device according to claim 1 wherein said energize means comprises a plurality of transistors corresponding to each of said heat elements, each of the heat elements being energized in case that the corresponding transistor is ON-operated.

6. A thermal head control device comprising energize means for energizing the desired number of a plurality heat elements being provided with a thermal head member, said thermal head control device further comprise:

first counter means for counting the number of printing operation executed by said thermal head member;

adjust means for adjusting a period for energizing the heat elements;

first control means for controlling said adjust means so as to shorten the period for energizing the heat elements by a predetermined differential value until the period becomes the first predetermined value each time that the number counted by said first counter means reaches a predetermined value;

second counter means for counting the number of spacing operation successively executed by said thermal head member;

second control means for controlling said adjust means so as to set the period for energizing the heat elements to the second predetermined value in case that the number counted by said second counter means reaches another predetermined value;

examine means for examining whether the number of said heat elements being energized in a printing operation is less than a predetermined value; and inhibit means for inhibiting the counting operation executed by said first counter means in case that the number examined by said examine means less than the predetermined value.

* * * * *